(12) United States Patent
Beaudet

(10) Patent No.: US 10,318,793 B2
(45) Date of Patent: Jun. 11, 2019

(54) METHOD FOR DETECTING FRAUD BY PRE-RECORDED IMAGE PROJECTION

(71) Applicant: Safran Identity & Security, Issy-les-Moulineaux (FR)

(72) Inventor: Jean Beaudet, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 86 days.

(21) Appl. No.: 15/335,106

(22) Filed: Oct. 26, 2016

(65) Prior Publication Data

US 2017/0116463 A1  Apr. 27, 2017

(30) Foreign Application Priority Data

Oct. 27, 2015 (FR) ..................................... 15 60250

(51) Int. Cl.
*G06K 9/00* (2006.01)
*G06F 16/583* (2019.01)
(Continued)

(52) U.S. Cl.
CPC ..... *G06K 9/00228* (2013.01); *G06F 16/5838* (2019.01); *G06F 21/32* (2013.01);
(Continued)

(58) Field of Classification Search
USPC ........... 1/1; 250/363.04; 340/5.8; 348/207.1, 348/187; 382/100, 115, 116, 118, 148;
(Continued)

(56) References Cited

U.S. PATENT DOCUMENTS

| 5,764,769 A | * | 6/1998 | Bennett | ............ | G11B 20/00086 |
| | | | | | 380/200 |
| 6,720,966 B2 | * | 4/2004 | Barth | .................... | G06T 11/005 |
| | | | | | 250/363.04 |

(Continued)

OTHER PUBLICATIONS

Chakraborty, S., et al., "An overview of face liveness detection," International Journal on Information Theory (IJIT), vol. 3, No. 2, pp. 11-25, Apr. 2014.*

(Continued)

*Primary Examiner* — Xuemei G Chen
(74) *Attorney, Agent, or Firm* — Womble Bond Dickinson (US) LLP

(57) ABSTRACT

The invention provides a method for detecting fraud (220) during biometric authentication of an individual comprising the acquisition (210), by an optical device, of a sequence of candidate images comprising at least two candidate images of an individual, with view to comparing said sequence with a reference image sequence comprising at least one reference image of an individual acquired during a preliminary enrollment step (100) by the same optical device, the method comprising the steps of:

estimating (221), from the sequence of candidate images, the geometrical parameters of the optical device having acquired said sequence of candidate images on the individual, and comparing (222) said geometrical parameters with the geometrical parameters of the optical device having acquired the reference image sequence, and from the result of the comparison, determining (223, 224) whether the verification image sequence was acquired from at least one pre-recorded image of the individual.

8 Claims, 3 Drawing Sheets

(51) Int. Cl.
*G06F 21/32* (2013.01)
*H04L 29/06* (2006.01)
*H04W 12/06* (2009.01)
*G06K 9/52* (2006.01)

(52) U.S. Cl.
CPC ..... *G06K 9/00288* (2013.01); *G06K 9/00899* (2013.01); *G06K 9/52* (2013.01); *H04L 63/0861* (2013.01); *H04W 12/06* (2013.01)

(58) Field of Classification Search
USPC .......................................................... 705/44
See application file for complete search history.

(56) References Cited

U.S. PATENT DOCUMENTS

| | | | | |
|---|---|---|---|---|
| 6,851,051 | B1* | 2/2005 | Bolle | G06F 21/32 382/115 |
| 7,251,347 | B2* | 7/2007 | Smith | G06K 9/00577 340/5.8 |
| 7,417,727 | B2* | 8/2008 | Polonskiy | A61B 5/0059 356/300 |
| 7,460,696 | B2* | 12/2008 | Rowe | G06K 9/00046 382/115 |
| 7,801,335 | B2* | 9/2010 | Hanna | G06K 9/00604 382/115 |
| 8,260,008 | B2* | 9/2012 | Hanna | G06K 9/00604 382/100 |
| 8,532,367 | B2* | 9/2013 | Kaganovich | G06T 7/579 345/169 |
| 8,659,659 | B2* | 2/2014 | Bradai | G06T 7/80 348/148 |
| 9,185,402 | B2* | 11/2015 | Wu | G06T 7/80 |
| 9,495,526 | B2* | 11/2016 | Hanna | G06F 21/32 |
| 2009/0153673 | A1* | 6/2009 | Chu | G06T 7/001 348/207.1 |
| 2014/0270404 | A1* | 9/2014 | Hanna | G06Q 30/0609 382/116 |
| 2014/0270409 | A1* | 9/2014 | Hanna | G06Q 30/0609 382/118 |
| 2014/0289834 | A1 | 9/2014 | Lindemann | |
| 2015/0029345 | A1* | 1/2015 | Ikeda | G06T 7/0018 348/187 |
| 2016/0104165 | A1* | 4/2016 | Hanna | G06F 21/32 705/44 |
| 2017/0085740 | A1* | 3/2017 | Lin | G06T 7/20 |
| 2018/0068178 | A1* | 3/2018 | Theobalt | G06K 9/00315 |

OTHER PUBLICATIONS

Kim, S., et al., "Face Liveness Detection Using Defocus," Sensors 2015, 15, pp. 1537-1563, Jan. 2015.*
French Search Report with English Language Translation Cover Sheet, dated Jun. 20, 2016, French Application No. 1560250.
Kim Sooyeon et al: "Face liveness detection using variable focusing", 2013 International Conference on Biometrics (ICB), IEEE, Jun. 4, 2013 (Jun. 4, 2013), pp. 1-6.
Allan Da Silva Pinto et al: "Video-Based Face Spoofing Detection through Visual Rhythm Analysis", Graphics, Patterns and Images (SIBGRAPI), 2012 25th SIBGRAPI Conference on, IEEE, Aug. 22, 2012 (Aug. 22, 2012), pp. 221-228.
Galbally Javier et al: "Biometric Antispoofing Methods: A Survey in Face Recognition", IEEE Access, vol. 2, Dec. 18, 2014 (Dec. 18, 2014), pp. 1530-1532.

* cited by examiner

METHOD FOR DETECTING FRAUD BY PRE-RECORDED IMAGE PROJECTION

FIELD OF THE INVENTION

The invention relates to a method for detecting fraud during biometric authentication, and a system for applying this method. The invention notably applies to the authentication of individuals at a personal electronic device such as a mobile phone or tablet, by comparison of face images of the individual.

STATE OF THE ART

Increasingly, personal electronic devices of the mobile phone or digital tablet type, which are provided with a digital camera, comprise a functionality for biometric authentication of the individual for accessing the other functions of the device.

This biometric authentication typically comprises the acquisition of an image or of a video sequence of the face of an individual, and the comparison of biometric features (or templates) extracted from this image or sequence with biometric features extracted from an image or sequence acquired beforehand and stored in the memory of the device. In the case of matching, access to certain functions of the device is allowed.

These devices may be exposed to frauds so called "by re-projection" frauds, which consist of presenting to the camera, during acquisition of an image or a video sequence of the candidate individual, an image or a pre-recorded video of the authorized individual, and reproduce on a screen, for example another telephone or another digital tablet.

This of course allows the identity of the authorized individual to be usurped in order to be able to access the functions of the electronic device.

The article of W. Wang and H. Farid, *Detecting Re-Projected Video*, describes the detection of a double projection of a video, i.e. the acquisition, by a camera, of a video recording of a sequence of images projected on a screen, and then the projection of a screen of this video recording. The principle is to detect a final distortion of the image (also called a skew) projected on the screen, by assuming that the camera having proceeded with the first acquisition of the sequence of images would not generate any distortion, and that the one having achieved recording on the screen of this sequence of images is positioned obliquely with respect to the screen.

This method only operates in rather limited applications, and notably found its limits in the case when the reacquisition of the sequence of projected images is front-parallel, i.e. in the case when the sensor of the camera which records the sequence of images diffused on the screen extends parallel to the screen, which is the most natural case.

PRESENTATION OF THE INVENTION

The object of the invention is to find a remedy at least partly to the drawbacks of the prior art.

In particular, an object of the invention is to propose a method for detecting fraud by re-projecting of a video sequence, the method being functional even in the absence of distortion of the final image.

In this respect, the object of the invention is a method for detecting fraud during biometric authentication of an individual comprising the acquisition, by an optical device, of a sequence of candidate images comprising at least two candidate images of an individual, with view to comparing said sequence with a reference image sequence comprising at least one reference image of an individual acquired during a preliminary enrollment step by the same optical device, the method comprising the steps of:

estimating, from the sequence of candidate images, the geometrical parameters of the optical device having acquired said sequence of candidate images on the individual, and comparing said geometrical parameters with the geometrical parameters of the optical device having acquired the reference image sequence, and from the result of the comparison, determining whether the verification image sequence was acquired from at least one pre-recorded image of the individual.

Advantageously, but optionally, the method for fraud detection may further comprise at least one of the following features:

if the estimated geometrical parameters are different from the geometrical parameters of the optical device having acquired the reference image sequence, the candidate image sequence is considered as having been acquired from a pre-recorded image, and the method comprises a step for detecting fraud.

the optical device comprises a sensor and optics, and the geometrical parameters of an optical device comprise the focal distance of the optics, the size of the pixels of the sensor, and the position of the projection of the centre of the optics on the sensor.

each image sequence is a video comprising a plurality of images, and the images of a same sequence are acquired for different relative positions of the individual with respect to the optical device.

The method may further comprise the estimation, from the candidate image sequence, of a parameter equal to the ratio between the focal distance of the optical device having acquired said sequence and the size of the pixels of the sensor of said optical device, and the comparison of said parameter with the parameter corresponding to the optical device having acquired the reference image sequence.

According to an embodiment, the invention also relates to a system for detecting fraud comprising an optical device for acquiring images and a processing unit comprising a processor and a memory, the system being characterized in that it is adapted for applying the fraud detection method according to the preceding description.

Advantageously, but optionally, the system according to the invention may be a personal electronic device of the personal computer, mobile telephone or digital tablet type.

According to another embodiment, the invention relates to a computer program product, comprising code instructions for executing a method comprising steps of:

estimating, from a first sequence of images, the geometrical parameters of the optical device having acquired said sequence of images, and comparing said geometrical parameters with reference geometrical parameters, when it is applied by a processor.

According to another embodiment, the object of the invention is a method for biometric authentication of an individual, comprising:

enrollment of an individual by acquiring, by means of an optical device, a reference image sequence of the individual comprising at least one image of the individual, and a verification of the identity of a candidate individual, said verification comprising the acquisition, by means of the same optical device as the one used during enrollment, of a sequence of candidate images of an individual comprising at least two images of the individual, the authentication method being characterized in that it further comprises, after the step for acquiring the candidate image sequence, the application of the fraud detection method according to the preceding description.

The fraud detection method according to the invention gives the possibility of detecting fraud by comparing the geometrical parameters of the camera having proceeded with the acquisition for the enrollment of the individual with that of the camera having proceeded with the verification, both of these cameras being assumed to be identical within the scope of the targeted applications.

Thus, in the absence of fraud, the cameras being identical, their geometrical parameters are also identical.

On the other hand, in the case of fraud by re-projection of images, the camera used during the verification acquires a sequence of images recorded beforehand and projected on a screen. This recording—projection—re-recording sequence implies that the estimated geometrical parameters of an equivalent camera directly acquiring the image of the individual differ from the actually used parameters of the camera.

DESCRIPTION OF THE FIGURES

Other features, objects and advantages of the present invention will become apparent upon reading the detailed description which follows, with reference to the appended figures, given as non-limiting examples and wherein.

DETAILED DESCRIPTION OF AT LEAST ONE EMBODIMENT OF THE INVENTION

Figure 1:
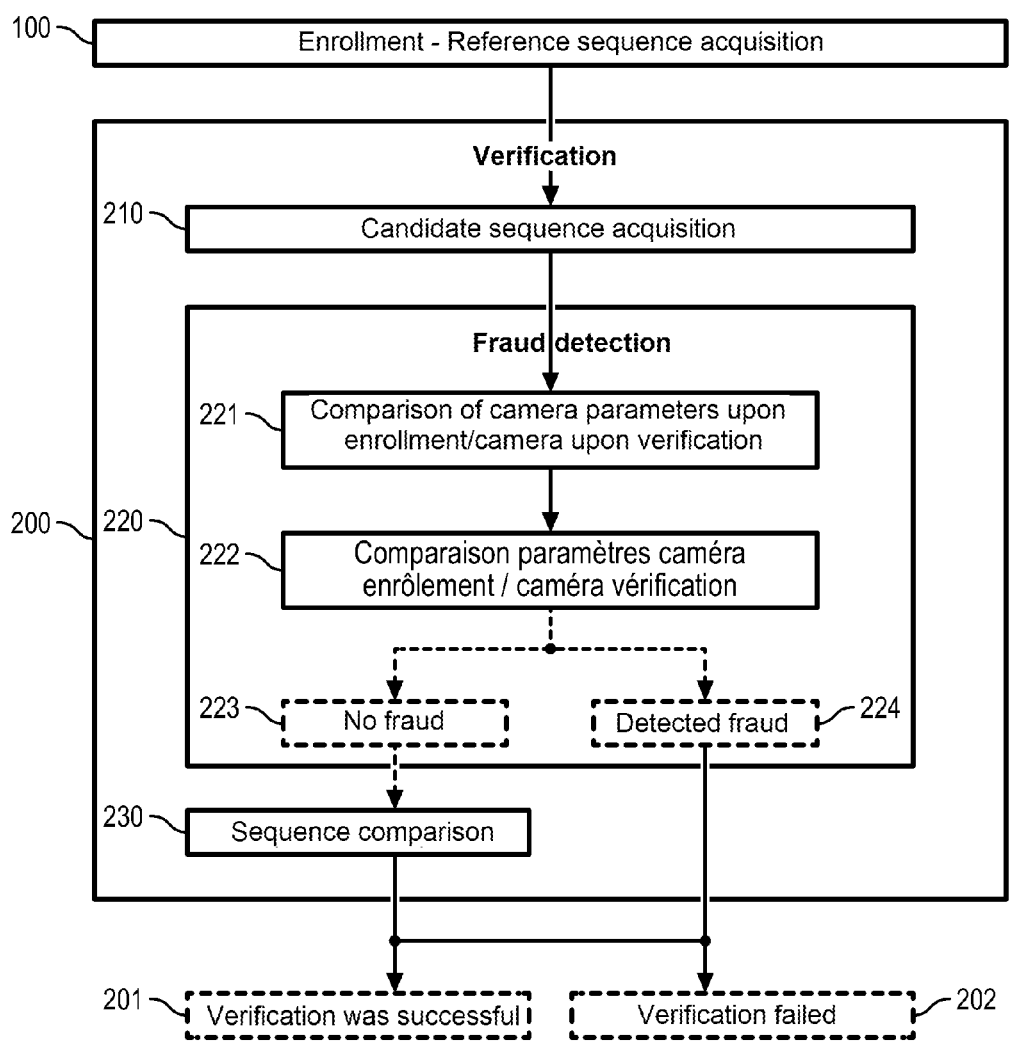
FIG. 1 represents the main steps of a biometric authentication method for an individual comprising the application of a fraud detection method according to an embodiment of the invention.

With reference to FIG. 1, the main steps of a biometric authentication for an individual are illustrated. A biometric authentication is the verification of the identity of a candidate individual as compared with reference biometric features of an identified individual with biometric features acquired on the candidate individual.

This authentication method is advantageously applied by a personal electronic device to an individual, for example a computer, a mobile telephone, a digital tablet, etc. The authentication method typically gives the possibility of only authorizing access to certain functionalities of the electronic device to the reference individual to whom belongs the electronic device.

Figure 2:
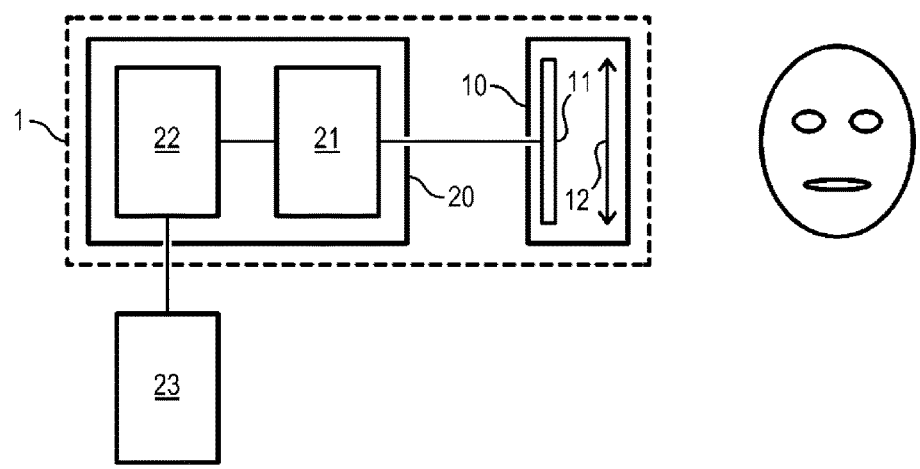
FIG. 2 schematically illustrates a system adapted for applying the method.

In FIG. 2, such an electronic device 1 has been illustrated schematically. It comprises an optical device 10 for acquiring images, such as for example a digital camera or a digital still camera. This optical device 10 schematically comprises a sensor 11, for example of the CCD or CMOS type. This sensor comprises a plurality of photosensitive pixels. The optical device 10 further comprises optics 12, i.e. a set of lenses, and/or a mirror, positioned between the sensor and the object an image of which is acquired.

The electronic device 1 further comprises a processing unit 20 connected to the optical device 10. This processing unit comprises a processor 21 and a memory 22.

Typically, the processing unit is adapted for controlling the sensor and providing software processing operations or corrections to the images acquired by the sensor. The processing unit is also adapted for processing the acquired images in order to apply the authentication and fraud detection method described hereafter, for example by executing with the processor dedicated code instructions.

The system 1 advantageously comprises an alert device 23 controlled by the processing unit 20, and adapted for emitting an audio signal or for displaying on a screen an error message in the case for fraud detection by the processing unit.

Biometric Authentication Method

Returning to FIG. 1, the biometric authentication which is applied is preferably of the type comprising a preliminary enrollment 100 of a reference individual by acquiring a so called reference image sequence, comprising at least one image of the reference individual. Preferably, the image of the individual is an image of the face of the individual.

This acquisition is applied by the optical device 10 of the electronic device 1. The reference image sequences is considered as a trustworthy datum, i.e. an authentic and direct recording (without re-projection) of the reference individual.

The biometric authentication then comprises a step 200 for verifying the identity of a candidate individual, in order to determine whether this individual corresponds to the reference individual.

This step first comprises the acquisition 210 of a so called candidate sequence of images of the candidate individual, comprising at least two images of the candidate individual, each image being preferably an image of the face of the candidate individual. This step is applied by the same optical device 10 as the one used for acquiring the reference image sequence. As described in more detail hereafter, the images of the verification sequence are acquired for different relative positions of the candidate individual with respect to the optical device 10.

The biometric authentication then comprises a comparison 230 of the images of the reference sequence and of the candidate sequence, or more specifically of biometric features of the individual appearing on these sequences of images and extracted from the images, for verifying whether the individual illustrated on the images is the same. The candidate individual may be identified as the reference individual and the verification step gives a positive result 201. In the opposite case, the authentication fails and the verification step gives a negative result 202.

The comparison of the individual appearing on the images is carried out in a way known to one skilled in the art.

An exemplary embodiment is for example detailed in the publication of Turk, M & Pentland, A. P. (1991, June). *Face recognition using eigenfaces*. In *Computer Vision and Pattern Recognition, 1991. Proceedings CVPR'91. IEEE Computer Society Conference on* (pp. 586-591). IEEE.

In the preferred application of the invention in which the authentication is applied at a personal electronic device, the authentication of the candidate individual allows the latter to access functions or data of the electronic device 1. In order to protect this device against fraud, the verification step 200 preferably comprises the application of a fraud detection method 220, after the step 210 for acquiring the sequence of candidate images, and before the comparison step 230.

Preferably, when a fraud has been detected at the end of the fraud detection method 220, the verification step 200 gives a negative result 202. In other words, the verification method results in the same result as during a comparison having failed without fraud detection, in order to avoid informing a fraudster on the cause of its failure. If necessary, the comparison step 230 may even be applied after the fraud has been detected in order to make the processing operations more similar in the absence and in the case of fraud.

Fraud Detection Method

The fraud detection method 220 is based on the fact that when a camera acquires an image of the image of an object projected on a screen, the geometrical parameters of an equivalent camera acquiring the final image from the object are different from those of a camera acquiring directly an image on the object.

Figure 3:
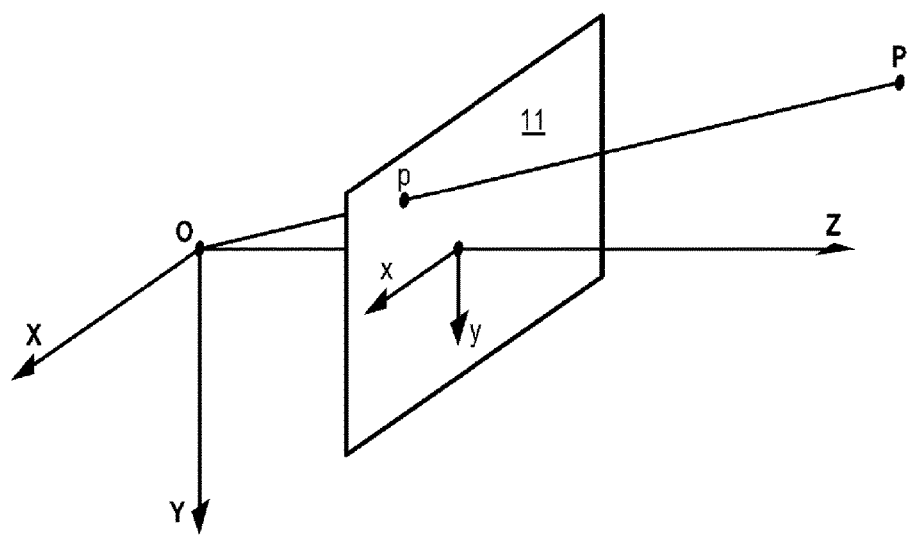
FIG. 3 illustrates notation conventions used relating to the parameters of the cameras.

With reference to FIG. 3, the optical devices used during the enrollment and the verification are supposed to be pinhole cameras.

The reference system of such a device is an orthogonal reference system centered on the optical centre of the device, having axes X, Y, coplanar with the sensor and Z orthogonal to the plane of the sensor. The projection p of a point P of coordinates on the sensor of the optical device is provided by the following relationship:

$p = K_{acq}[Rt]P$

Wherein R is a 3*3 matrix of rotation, t is a 3*1 vector of translation, [Rt] expressing the layout of the object in three-dimensions with respect to the acquisition device, and $K_{acq}$ is the matrix of the intrinsic geometrical properties of the optical device having achieved acquisition of the image.

$$K_{acq} = \begin{bmatrix} \alpha & \eta & c_x \\ & \alpha' & c_y \\ & & 1 \end{bmatrix}$$

$\alpha$ and $\alpha'$ correspond to the ratio between the focal distance $z_0$ of the optical device on the size of the pixels respectively along the x axis and the y axis. By assuming that the height of a pixel along the axis x is equal to the width of a pixel along the axis y, one has $\alpha' = \alpha$.

Further, $\eta$ expresses the distortion of the image (skew) if the axes of the reference system are not orthogonal. This is not the case in the selected assumption herein before therefore it is considered that $\theta = 0$.

Finally $c_x$ and $c_y$ respectively correspond to the x position and y position of the projection on the sensor of the optical centre O of the device. When the optical centre is projected on the middle of the sensor, this may be simplified by $c_x = c_y = 0$.

During the enrollment step 100, by noting as $K_0$ the matrix of the intrinsic geometrical properties of the optical device 20, each point of an image is therefore expressed as follows:

$p = K_0[R\ t]P$ $$K_0 = \begin{bmatrix} \alpha_0 & & c_{0x} \\ & \alpha_0 & c_{0y} \\ & & 1 \end{bmatrix}$$

Figure 4A:
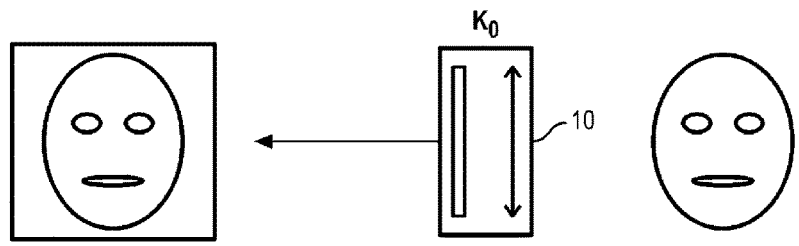
FIGS. 4a and 4b respectively schematically illustrate the acquisition of a candidate image sequence in the absence of fraud and in the case of fraud.

During a step for acquiring a sequence of candidate images 210, schematically illustrated in FIG. 4a, if this acquisition is achieved with the same optical device 20, directly on the candidate individual, the same relationship may be applied.

On the other hand, if during this acquisition, an image is acquired from an image projected on a screen, this relationship is not applicable.

Figure 4B:
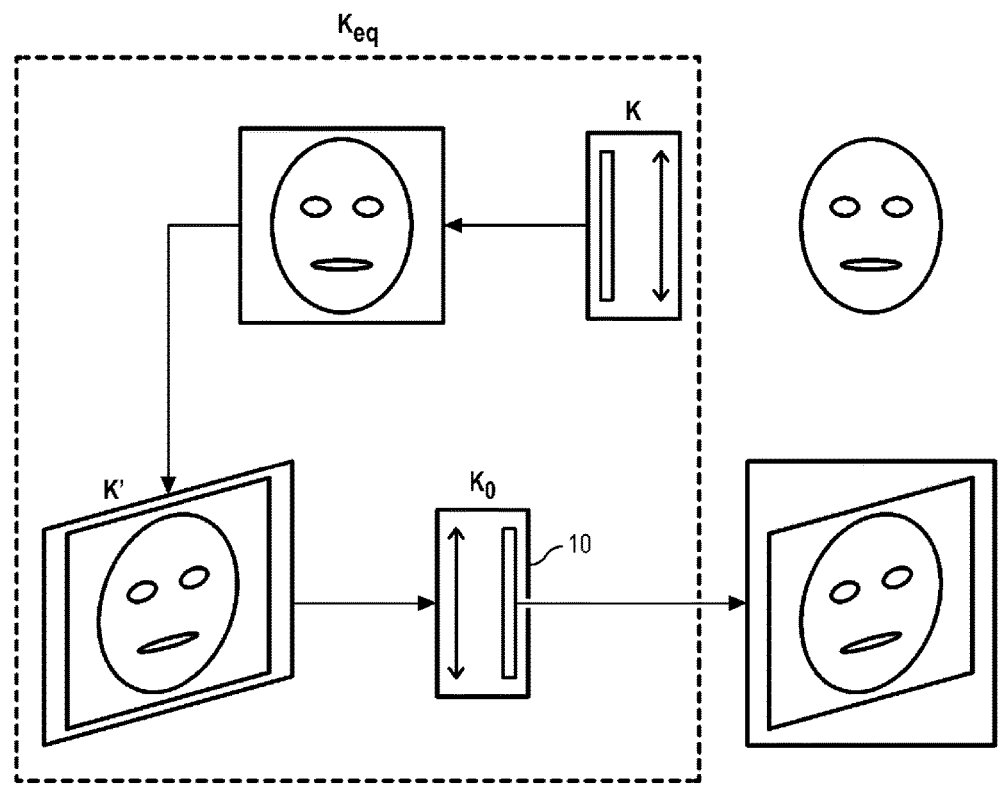

Indeed, with reference to FIG. 4b, a first image of the candidate individual is acquired by an optical device, which may not be the same as the device 10 used for the enrollment. The matrix of the intrinsic geometrical properties of this device is noted as K.

$$K = \begin{bmatrix} \beta & & d_x \\ & \beta & d_y \\ & & 1 \end{bmatrix}$$

The position of an object on the image obtained by this device is:

$p = K[Rt]P$

The diffusion of the image on a screen amounts to applying a change in scale to this image, so that the coordinates of the same point on the screen are given by:

$$p' = \begin{bmatrix} \gamma & & e_x \\ & \gamma & e_y \\ & & 1 \end{bmatrix} K[R\ t]P$$

Wherein y, $e_x$ and $e_y$ represent the change in scale between the acquired image and the image diffused on the screen.

K' is noted as:

$$K' = \begin{bmatrix} \gamma & & e_x \\ & \gamma & e_y \\ & & 1 \end{bmatrix} K$$

In order to obtain:

$p' = K'[Rt]P$

When finally the diffused image on the screen is recorded by the optical device 20, the screen being assumed fixed with respect to the device, and with a position given by [R't'] with $R' = [r_1'r_2']$ wherein $r_1'$ and $r_2'$ are 3*1 rotation vectors, and t' is a vector of coordinates $t'_x$, $t'_y$ and $t'_z$, the image of the image illustrated on the screen by the optical device 10 is given by:

$p'' = K_0[r_1'r_2't']K'[Rt]P$

In the case when the screen is presented parallel to the optical device 10, $[r_1'r_2't']$ is summarized as:

$$\begin{bmatrix} 1 & & t'_x \\ & 1 & t'_y \\ & & t'_z \end{bmatrix}$$

If it is also assumed that the optical devices used for both successive acquisitions of images have no distortion and have square pixels then, an equivalent global matrix $K_{eq}$ is obtained:

$$p'' = K_{eq}[R\ t]P$$

$$p'' = \begin{bmatrix} \lambda & & f_x \\ & \lambda & f_y \\ & & 1 \end{bmatrix}[R\ t]P$$

Wherein $\lambda = \alpha_0 \beta y/t'_z$ and fx and fy may be expressed according to the parameters introduced earlier according to the preceding equations.

The acquisition—projection—reacquisition sequence may therefore be assimilated to a direct acquisition of an image by an optical device for which the intrinsic parameters are the equivalent matrix $K_{eq}$.

Thus, returning to FIG. 1, the fraud detection method 220 comprises a first step 221 for estimating geometrical parameters of the optical device used for obtaining the sequence of candidate images. The obtained parameters correspond, i.e.:
  in the absence of fraud, to parameters of the matrix $K_0$ of the optical device 10 used for acquiring the sequence of candidate images 210 during the verification,
  in the case of fraud, to parameters of a matrix $K_{eq}$ of an equivalent optical device integrating the successive changes of parameters of an optical device resulting from an acquisition—projection—re-acquisition sequence, as described hereinbefore.

One skilled in the art is aware of methods for estimating camera parameters from one or several images.

As indicated hereinbefore, the sequence of candidate images comprises a plurality of images, and the images of the sequence are acquired at different relative positions of the individual with respect to the optical device 10. This is advantageously obtained by asking, during the acquisition of the sequence of candidate images, the individual to move with respect to the optical device 10. In the case of fraud, this is the first acquisition of the candidate individual, which is then projected on the screen, which comprises the displacement.

The estimation 221 of the parameters then comprises the estimation of the parameter corresponding to the ratio between the focal distance of the optical device used on the size of a pixel, which is generally noted as $\lambda$, and which is equal to $\alpha_0$ in the absence of fraud and different from $\alpha_0$ in the case of fraud. This step is preferably applied in the way described in the article of Li, Hongdong, *A simple solution to the Six-point Two-view Focal-length Problem.*

Alternatively, the estimation 221 may be applied by the so called technique of adjusting beams (known as bundle adjustment), and described in the article of Triggs, B., McLauchlan, P. F., Hartley, R. I., & Fitzgibbon, A. W. (2000). *Bundle adjustment—a modern synthesis*, In *Vision algorithms: theory and practice* (pp. 298-372), Springer Berlin Heidelberg. According to this technique, all the parameters of the matrix K of intrinsic geometrical parameters may be estimated.

Moreover it is assumed that the intrinsic geometrical parameters $K_0$ of the optical device 10 are known, this device being the one used during the enrollment for directly obtaining from the reference individual, an image of the latter.

The knowledge of the geometrical parameters of the optical device 10 may for example stem from the estimation of these parameters according to the step 221 during the enrollment step. In this case, the reference image sequence comprises at least two images, on which the individual has different relative positions with respect to the optical device. This relative position variation gives the possibility of estimating the parameters on the images.

Alternatively, the geometrical parameters may be known prior to the application of the enrollment step, for example by calibrating the optical device or an optical device of the same version. Reference may be made for example to the publication of Tsai, R. Y. (1987), *A versatile camera calibration technique for high-accuracy 3D machine vision metrology using off-the-shelf TV cameras and lenses. Robotics and Automation, IEEE Journal of,* 3(4), 323-344.)

The fraud detection method then comprises the comparison 222 of the estimated parameters with those of the optical device 10.

This comparison is advantageously computed from the ratio between the computed parameter and the parameter corresponding to the optical device 10, and the comparison of this ratio with a threshold, for example:

$$\left| \frac{\lambda}{\alpha_0} - 1 \right| \geq \varepsilon$$

In the case of matching (in the preceding example, if the equation is not verified), the absence of fraud is inferred during a step 223 since this indicates that the optical device 10 used during the acquisition of the candidate image sequence has directly acquired the sequence from the individual and not from an image of the latter.

The method may then comprise the application of the step 230 for comparison of the images in order to authenticate the individual.

If, on the contrary no correspondence is detected between the parameters (in the preceding example, if the equation is verified), a fraud is detected during a step 224 and the method provides a negative authentication result 202. Optionally, the method may however comprise the application of step 230 in spite of the fraud detection. An alert may be triggered by a visual display, for example an error message, or by an audio signal.

The invention claimed is:

1. A method for detecting fraud during biometric authentication, on the basis of a preregistered reference image sequence comprising at least one reference image of an individual acquired by an optical device during a preliminary enrollment step, the method comprising the steps of:
  acquiring, with the same optical device, a sequence of candidate images comprising at least two candidate images of the individual,
  estimating, from the sequence of candidate images, geometrical parameters of the optical device having acquired said sequence of candidate images on the individual, including a parameter equal to the ratio between the focal distance of the optical device having acquired said sequence and the size of the pixels of the sensor of said optical device,
  comparing said geometrical parameters with geometrical parameters of the optical device having acquired the reference image sequence, including comparing the previously estimated parameter with the parameter equal to the ratio between the focal distance of the optical device having acquired the reference image sequence and the size of the pixels of the sensor of said optical device, and from the result of the comparison, determining whether the sequence of candidate images was acquired from at least one pre-recorded image of the individual, wherein each image sequence is a video comprising a plurality of images, and the images of each sequence are acquired for different relative positions of the individual with respect to the optical device.

2. The fraud detection method according to claim 1, wherein, the estimated geometrical parameters are the same as those of the optical device having acquired the reference image sequence in the absence of fraud, and correspond to the geometrical parameters of an equivalent optical device having acquired the sequence of candidate images directly on the individual in the case of fraud by re-projection of a pre-recorded image, and wherein, if the estimated geometrical parameters are different from the geometrical parameters of the optical device having acquired the reference image sequence, the candidate image sequence is considered as having been acquired from a pre-recorded image, and the method comprises a fraud detection step.

3. The fraud detection method according to claim 1, wherein the optical device comprises a sensor and optics, and the geometrical parameters of an optical device comprise the focal distance of the optics, the size of the pixels of the sensor, and the position of the projection of the centre of the optics on the sensor.

4. The fraud detection method according to claim 1, wherein each optical device used for acquiring the sequence of candidate images and the reference image sequence is modeled as a pinhole camera such that the projection of a point P on an optical sensor of the optical device is provided by the relationship:

$$p=K[Rt]P$$

wherein K is the matrix of the intrinsic geometrical properties of the optical device, R is a matrix of rotation and t is a translation vector, and the estimation of the geometrical parameters of the optical device having acquired the sequence of candidate images comprises the estimation of the parameters of the matrix $K_{eq}$ of an equivalent optical device having acquired said images directly on the individual, and the comparison with the parameters of the matrix $K_0$ of the optical device having acquired the candidate image sequence.

5. The fraud detection method according to claim 1, further comprising a preliminary enrollment step wherein an individual is enrolled by acquiring, by means of the optical device, a reference image sequence of the individual comprising at least one image of the individual, and the optical device used for enrollment being the same as the optical device used for acquisition of the sequence of candidate images during biometric authentication.

6. A fraud detection system comprising an optical device for acquiring images and a processing unit comprising a processor and a memory, wherein the processor is configured to execute the following steps:

sending an instruction to the optical device to acquire a sequence of candidate images comprising at least two candidate images, estimating, from the sequence of candidate images, geometrical parameters of the optical device having acquired said sequence of candidate images, including a parameter equal to the ratio between the focal distance of the optical device having acquired said sequence and the size of the pixels of the sensor of said optical device, comparing said geometrical parameters with geometrical parameters of an optical device having acquired a preregistered reference image sequence, including comparing the previously estimated parameter with the parameter equal to the ratio between the focal distance of the optical device having acquired the reference image sequence and the size of the pixels of the sensor of said optical device, and from the result of the comparison, determining whether the sequence of candidate images was acquired from at least one pre-recorded image, wherein each image sequence is a video comprising a plurality of images, and the images of each sequence are acquired for different relative positions of an individual with respect to the optical device.

7. The fraud detection system according to claim 6, said system being a personal computer, a mobile telephone or a digital tablet.

8. A non-transitory computer-readable storage medium comprising code instructions, when applied by a processor, for executing a method comprising steps of:

acquiring, with an optical device, a sequence of candidate images comprising at least two candidate images, estimating, from the sequence of candidate images, geometrical parameters of the optical device having acquired said sequence of images, including a parameter equal to the ratio between the focal distance of the optical device having acquired said sequence and the size of the pixels of the sensor of said optical device, comparing said geometrical parameters with reference geometrical parameters, including comparing the previously estimated parameter with the parameter equal to the ratio between the focal distance of the optical device having acquired the reference image sequence and the size of the pixels of the sensor of said optical device, and from the result of the comparison, determining whether the sequence of candidate images was acquired from at least one pre-recorded image, and determining whether an individual having used the sequence of candidate images for a biometric authentication has attempted fraud, wherein each image sequence is a video comprising a plurality of images, and the images of each sequence are acquired for different relative positions of the individual with respect to the optical device.

* * * * *